Sept. 30, 1958  R. C. DRUTOWSKI  2,854,299
ANTIFRICTION BEARING

Filed Feb. 16, 1955  2 Sheets-Sheet 1

INVENTOR:
RICHARD C. DRUTOWSKI
by Edward H. Goodrich.
HIS ATTORNEY.

Sept. 30, 1958     R. C. DRUTOWSKI     2,854,299
ANTIFRICTION BEARING
Filed Feb. 16, 1955     2 Sheets-Sheet 2

INVENTOR:
RICHARD C. DRUTOWSKI
by Edward H. Goodrich.
HIS ATTORNEY.

# United States Patent Office 2,854,299
Patented Sept. 30, 1958

2,854,299

ANTIFRICTION BEARING

Richard C. Drutowski, Royal Oak, Mich., assignor to General Motors Corporation, Detroit, Mich., a corporation of Delaware Application February 16, 1955, Serial No. 488,503

9 Claims. (Cl. 308—200)

This invention relates to antifriction bearings of the ball and roller type and more particularly to an arrangement for antifrictionally separating the balls or rollers in such a bearing.

It is well recognized that the load carrying rolling elements of an antifriction bearing should be uniformly spaced to evenly distribute the bearing load. These rolling elements should not strike against each other during bearing operation since this materially increases the bearing friction, causes wear upon the rolling elements and shortens the bearing life. Hence, it has been common practice to circumferentially separate the annular series of balls or rollers in an antifriction bearing by means of a cage ring or separator wherein each of the balls or rollers is loosely received for rotation in a cage pocket. However, with such an arrangement, even in the presence of a bearing lubricant, there is an objectionable frictional rubbing of the rolling elements against the sides of the cage pockets which produces objectionable heating of the bearing and wear of the cage, all of which leads to a reduced bearing life. It has also been contemplated to separate the load carrying rolling elements by means of balls interspersed between the rolling elements and guided by a separate bearing raceway. Such an arrangement has been costly and complicated and has often resulted in frictional rubbing of the intervening balls against the rolling elements which produces objectionable friction within the bearing thereby shortening the bearing life.

It is, therefore, an object of this invention to provide an improved arrangement for spacing the load carrying rolling elements of an antifriction bearing.

It is a further object to provide an improved separator for spacing the adjacent rolling elements of an antifriction bearing and which separator is antifrictionally supported by the rolling elements.

It is a still further object to provide in an anti-friction bearing having load-carrying rolling elements, an improved separator construction of simple economical construction and including rolling members supported by the adjacent load-carrying rolling elements.

To these ends and also to improve generally upon devices of this character, this invention consists in the various matters hereinafter described and claimed. In its broader aspects, the invention is not necessarily limited to the specific structures selected for illustrative purposes in the accompanying drawings wherein—

Figure 1:
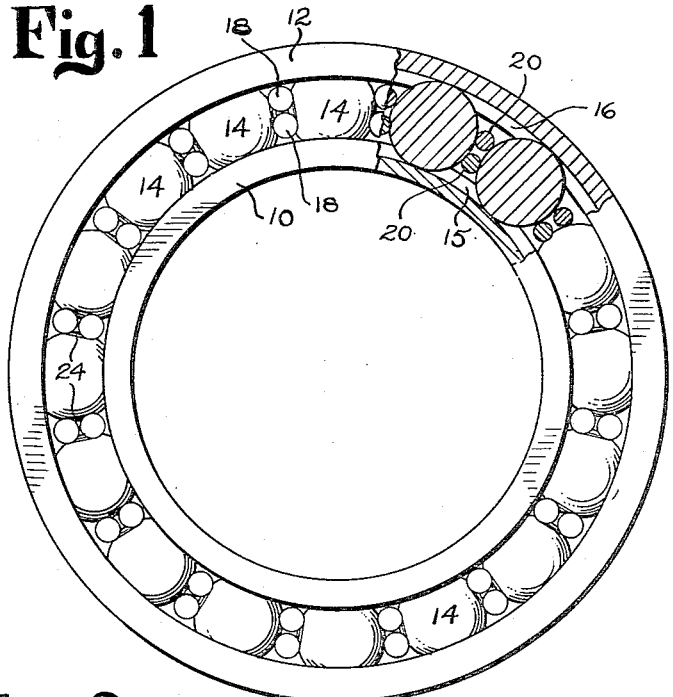
Figure 1 is a partly broken away end elevation illustrating one embodiment of my invention.

Generally considered, an inner race ring 10 and an outer race ring 12 are arranged for relative antifrictional coaxial rotation with respect to each other through an intervening series of spaced rolling elements, such as balls 14, which are in rolling engagement with an inner raceway 15 and an outer raceway 16. These rolling elements are antifrictionally spaced from each other by intervening members, such as rollers 18, which are carried by the rolling elements in freely rolling contact therewith to eliminate the friction usually produced by the rubbing of these rolling elements against a separator.

Figure 2:
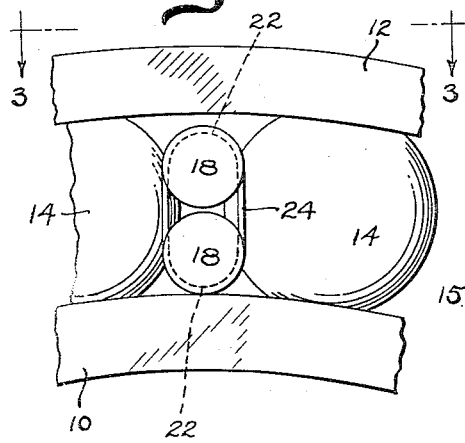
Figure 2 is an enlarged fragmentary end elevation showing the separator arrangement of Figure 1.
Figure 3:
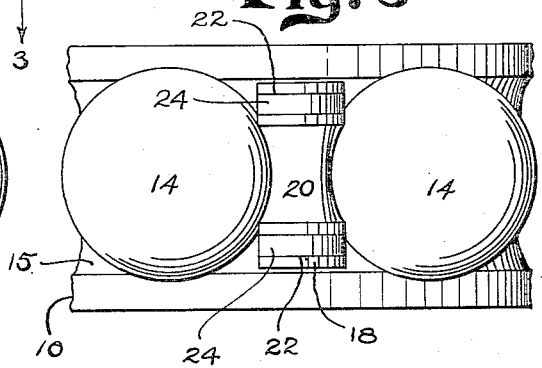
Figure 3 is a fragmentary view taken substantially in the position indicated by the arrows 3—3 on Figure 2 and with the outer race ring removed.

In the embodiments of Figures 1, 2 and 3, the load carrying balls 14 which freely roll in the raceways 15 and 16 to provide relative rotation of the race rings 10 and 12, are substantially uniformly and circumferentially spaced by locating between each pair of adjacent balls a pair of rollers 18 in freely rotatable engagement with and supported by the balls. Each roller 18 may be somewhat hour glass in shape with an intermediate raceway 20 between a pair of annular pulley grooves 22 respectively located at each end of the roller. I preferably make the raceway 20 arcuate in form longitudinally of the roller to interfit in free rolling contact with both of the adjacent balls 14 at each side thereof. A belt 24 of suitable flexible material runs in the corresponding grooves 22 at each end of the rollers 20 to support these rollers in freely rolling contact with the adjacent balls and respectively at each side of a pitch circle passing through the axes of the balls 14. Preferably, the belts 24 are of such a length that the rollers 18 are in loose freely rolling engagement with the balls 14 to avoid any frictional binding which might be occasioned by expansion of the bearing parts during bearing operation.

With this arrangement, the rollers 18, which may be of an axial length slightly less than the width of the adjacent raceways 15 and 16, are supported by the belts 24 and the balls 14 and remain out of engagement with both race rings 10 and 12. Hence, any movement imparted to a spacing roller 18 by the balls will be a free antifrictional rolling contact with the adjacent balls 14. If desired, the belts 24 between each pair of rollers 18 may be of slightly greater length than that necessary to maintain both rollers in positive rolling contact with the balls 14 at each side thereof but still maintain these rollers out of race ring contact. With this arrangement, a slightly relative circumferential movement of the balls with respect to each other may be permitted as the balls move into and out of the load carrying zone of the bearing.

Figure 4:
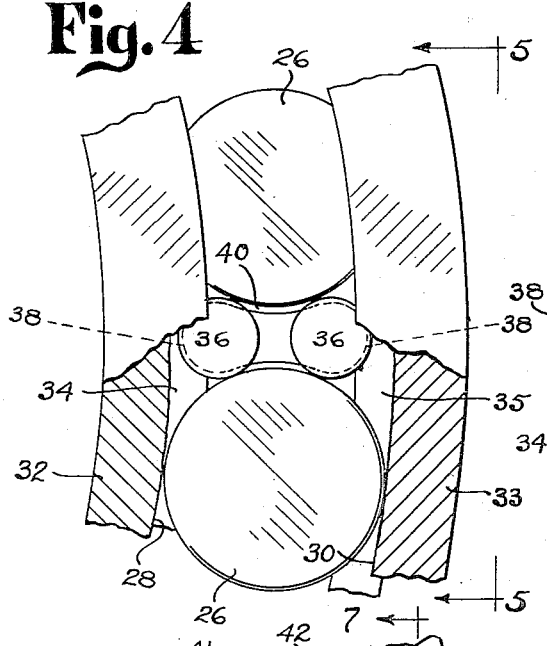
Figure 4 is a fragmentary end elevation partly in section and showing another embodiment of the invention.
Figure 5:
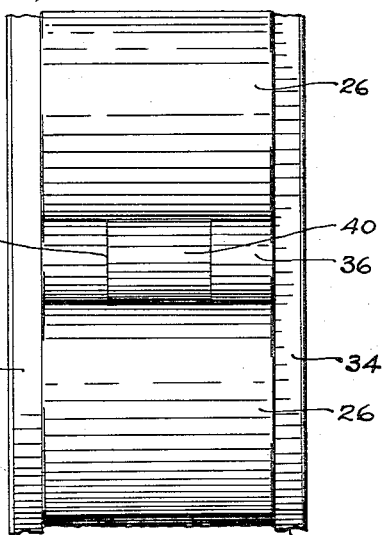
Figure 5 is a fragmentary view taken generally in the position shown by the arrows 5—5 on Figure 4 and with the outer race ring removed.

In the embodiment of Figures 4 and 5, there is shown an antifriction roller bearing wherein a series of circumferentially spaced generally cylindrical load-carrying rollers 26 are in rolling contact with inner and outer raceways 28 and 30 on inner and outer race rings 32 and 33. If desired, the race rings 32 and 33 may be provided with annular shoulders 34 and 35 at each side of the raceways 28 and 30 to hold the bearing parts in assembled relation and to axially maintain the rollers within the raceways. The rollers 26 are circumferentially spaced by providing between each pair of adjacent rollers a pair of spacing rollers 36 provided intermediate their ends with pulley grooves 38 in which are received a suitable flexible belt 40 to hold these spacing rollers 36 in freely rolling engagement with the adjacent load-carrying rollers 26. The rollers 36 are of slightly lesser length than the space between the opposing raceway shoulders 34 and 35, and the belts 40 are preferably of such length and thickness that the rollers 36 will be supported between and only by the adjacent load carrying rollers 26 and preferably at each side of a pitch circle which passes through the axes of the load carrying rollers 26. If desired, the belts 40 may be of a length to permit slight movement of the spacing rollers 36 radially of the bearing to allow for slight relative circumferential movements of adjacent rollers upon entering and upon leaving a load carrying zone of the bearing. However, these belts are of such a length as to prevent any engagement of the spacing rollers with either raceway 28 or 30.

Figure 6:
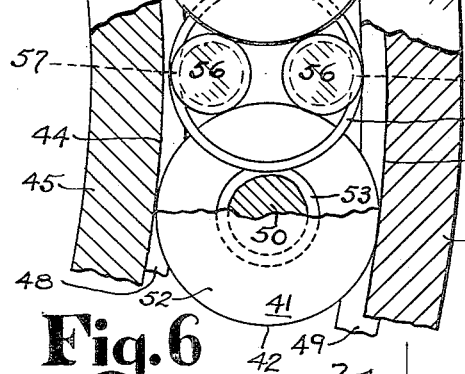
Figure 6 is a fragmentary end elevation partly in section and showing another form of the invention.
Figure 7:
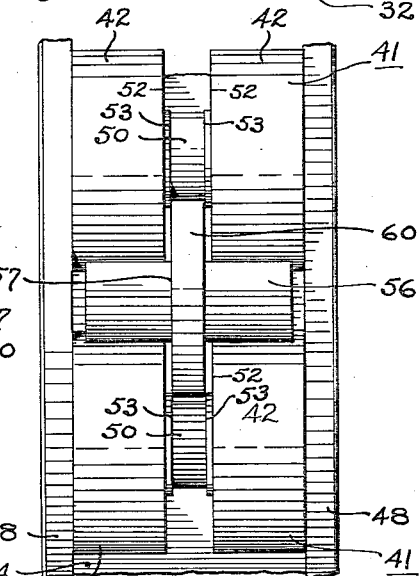
Figure 7 is a fragmentary view taken generally in the position shown by the arrows 7—7 on Figure 6 and with the outer race ring removed.
Figure 8:
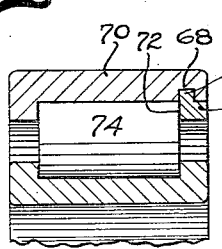
Figure 8 is a fragmentary cross section showing an arrangement for holding the roller bearing parts in assembled relation.

In the embodiment of Figures 6 and 7, a plurality of circumferentially spaced rollers 41 are each provided with a pair of similar axially spaced cylindrical portions 42 arranged to freely roll against an inner raceway 44 on an inner race ring 45 and against an outer raceway 46 on an outer race ring 47. Similar to the structure of Figures 4 and 5, the inner race ring 45 and the outer race ring 47 may be respectively provided with pairs of spaced annular shoulders 48 and 49 which loosely receive the rollers 41 therebetween to axially position the rollers and secure the parts in assembled relation. The rollers 41 intermediate their ends are necked down at 50 providing a generally cylindrical connecting portion terminating in a pair of stepped shoulders 52 and 53. Between each pair of rollers 41 there is provided respectively at each side of the pitch circle of these rollers, a pair of spacing rollers 56 having intermediate necked down pulley grooves 57. A guiding ring 60 rotatably engages within the pulley grooves 57 and serves as a driving belt to maintain the rollers 56 in free rolling contact with the load carrying cylindrical portions 42, and this ring 60 is loosely received between the roller shoulders 53 to axially locate the rollers 56 out of engagement with the shoulders 48 and 49. The external diameter of the ring 60, as shown in Figure 6, is less than the distance between the cylindrical portions 50 so that it will not engage thereagainst. Also, the spacing rollers 56 and their grooves 57 are of such diameters that the ring 60 is spaced from the raceways 44 and 46 as shown in Figure 6.

For convenience of assembly of the structures shown in Figures 4, 5, 6 and 7, the shoulder at one or more ends of one of the raceways 28, 30, 44 or 46 may comprise a removable C-shaped ring 66 having a radially projecting lip 67 demountably interfitting within a groove 68 formed in one end of a race ring and herein illustrated as an outer race ring 70. The open ended ring 66 may have a flat inner shoulder 72 serving to limit the endwise movement of a roller 74 in one direction.

I claim:

1. An antifriction bearing comprising a pair of relatively movable race members each of which has a raceway, spaced load-carrying rolling elements in rotatable engagement with both raceways, a pair of cooperating rollers spaced from both raceways and located between and engageable with a pair of said rolling elements, and a flexible belt wrapping around the rollers and located between said rolling elements.

2. An antifriction bearing comprising a pair of relatively rotatable race rings, a plurality of spaced load-carrying rolling members rotatably engageable with both race rings, a pair of spacing rollers rotatably engageable with and cooperatively separating an adjacent pair of said rolling members, a freely flexible non-circular belt in driving connection with both spacing rollers, and the belt and load-carrying rolling members cooperatively supporting the spacing rollers in spaced relation to each other and out of engagement with said race rings.

3. An antifriction bearing comprising a pair of relatively rotatable race rings, an annular series of spaced load-carrying rolling elements therebetween, a pair of cooperating spacing rollers located between and engageable with each pair of adjacent load-carrying rollers, a rotatable freely flexible driving belt connection between each pair of spacing rollers, and each pair of spacing rollers and their driving connection being supported by the adjacent load-carrying rolling elements independently of and in spaced relation to the race rings.

4. An antifriction bearing comprising a pair of relatively rotatable race rings each having a raceway, a plurality of spaced load-carrying rolling elements in rotatable engegement with said raceways, a pair of spaced rollers rotatably engageable with and separating an adjacent pair of said rolling elements from each other, said spacing rollers being respectively disposed at opposite sides of a pitch circle including the centers of the load-carrying rolling elements, and a non-circular freely flexible driving belt rotatably engaging both spacing rollers and maintaining said rollers between the load-carrying elements and located independently of both race rings.

5. An antifriction bearing comprising a pair of relatively rotatable race rings each having a circular raceway, a plurality of circumferentially spaced load-carrying rolling elements in rotatable engagement with both raceways, a pair of spaced rollers rotatably engageable with and spacing an adjacent pair of said load-carrying elements from each other, each roller having a pulley groove, a non-circular freely flexible driving belt engaging within the pulley grooves and securing the spacing rollers in rotatable engagement with the load-carrying elements and in spaced relation to both race rings.

6. An antifriction bearing comprising a pair of relatively rotatable race rings, an annular series of circumferentially spaced load carrying balls therebetween, a pair of cooperating spacing rollers between and engageable with each pair of adjacent balls, said spacing rollers being located respectively at opposite sides of a pitch circle including the ball centers, and a non-circular flexible driving belt connection between each pair of spacing rollers, said driving belt and spacing rollers being supported by the adjacent balls and independently of both race rings.

7. An antifriction bearing comprising a pair of relatively rotatable race rings, an annular series of circumferentially spaced load carrying balls therebetween, a pair of cooperating spacing rollers located between and rotatably engageable with each pair of adjacent balls, each roller having a generally hour glass contour in interfitting relation with the curvature of said balls and being located at opposite sides of a circle defined by the line of ball centers, a non-circular flexible driving belt connection between each pair of rollers, and each pair of rollers and the associated belt being supported solely by the adjacent balls in spaced relation to both race rings.

8. An antifriction bearing comprising a pair of relatively rotatable race rings, an annular series of circumferentially spaced load carrying rolling elements therebetween, annular shoulders on the race rings axially locating the load-carrying elements with respect to the race rings, a pair of cooperating spacing rollers located between and rotatably engageable with each pair of adjacent load carrying elements, said spacing rollers being generally cylindrical and being respectively disposed at opposite sides of a pitch circle including the axes of the load carrying elements, and a freely flexible non-circular belt in driving engagement with each pair of spacing rollers and engageable with the adjacent load carrying rollers, and each pair of spacing rollers and associated belt being supported solely by the adjacent load carrying rollers and in spaced relation to both race rings.

9. An antifriction bearing comprising a pair of relatively rotatable race rings, an annular series of circumferentially spaced load carrying rollers therebetween, a pair of cooperating spacing rollers located between and engageable with each pair of adjacent load carrying rollers, a flexible non-circular driving belt rotatably engageable with each pair of spacing rollers and maintaining said spacing rollers in rotatable engagement with the adjacent load carrying rollers and in spaced relation to both race rings, annular shoulders on both race rings maintaining the bearing parts in unit handling assembly, and one of said annular shoulders being located on a demountable ring secured to one of the race rings.

References Cited in the file of this patent

UNITED STATES PATENTS

| | | |
|---|---|---|
| 498,737 | Beaupre | May 30, 1893 |
| 892,691 | Sharpneck | July 7, 1908 |
| 1,787,603 | Taylor | Jan. 6, 1931 |

FOREIGN PATENTS

| | | |
|---|---|---|
| 443,765 | France | Oct. 2, 1912 |